United States Patent [19]

Price et al.

[11] Patent Number: 4,481,667

[45] Date of Patent: Nov. 6, 1984

[54] ITEM COUNTING APPARATUS

[75] Inventors: Earl T. Price; Arthur F. Allison, both of San Jose, Calif.

[73] Assignee: Autronics Corporation, Arcadia, Calif.

[21] Appl. No.: 332,663

[22] Filed: Dec. 21, 1981

[51] Int. Cl.[3] .......................... G06K 7/10; G06K 9/20; G06M 7/00; G06M 7/06

[52] U.S. Cl. .......................................... 382/65; 377/6; 377/8; 235/455

[58] Field of Search ............... 382/50, 65, 53; 331/15; 356/47, 51, 222, 213, 225, 257; 235/455, 92 V; 250/205, 222.2, 571, 221, 223 R; 358/199, 209, 285; 377/6, 8, 53, 58, 59

[56] References Cited

U.S. PATENT DOCUMENTS

| | | | |
|---|---|---|---|
| 4,217,491 | 8/1980 | Dufford Jr. et al. | 377/3 |
| 4,250,488 | 2/1981 | Haupt | 235/455 |
| 4,296,314 | 10/1981 | Dabisch et al. | 377/8 |
| 4,384,195 | 5/1983 | Nosler | 377/8 |

*Primary Examiner*—John C. Martin
*Assistant Examiner*—Michael D. Parker
*Attorney, Agent, or Firm*—Fred N. Schwend

[57] ABSTRACT

An electro-optical counter or detecting apparatus for detecting passage of items therepast. A light emitter projects a constantly pulsed beam of light onto the path of the items and light sensors sense the optical energy reflected from such items. One sensor controls the light emitter to so regulate the amount of light emitted by each pulse that the amount of optical energy reflected by the items does not vary as a function of the reflectivity of the surfaces of such items and does not exceed a predetermined level. Another light sensor senses changes in optical energy beyond such predetermined level and thus senses only the passage of an edge of each item past the pulses light beam.

9 Claims, 6 Drawing Figures

ITEM COUNTING APPARATUS

BACKGROUND OF THE INVENTION

1. Field of the Invention

This invention relates to item counting or detecting apparatus. Although it is generally applicable to all types of item counting or detecting apparatus, it is especially applicable to the counting of printed articles, such as newspapers, magazines, or the like which are conveyed in either overlapped condition or singly past a counting station.

2. Description of the Prior Art

Heretofore, counters for the above purpose were generally of the mechanical type wherein the leading edges of printed articles being counted engage mechanical sensors to cause counting. Such mechanical systems, however, tend to introduce errors in counting due to irregularities in the printed articles, variations in thickness of the articles, inertia and vibration of the counter actuator, particularly when operating under high speed, etc.

Accordingly, attempts have been made to utilize electro-optical counting devices for the above purpose but these have also encountered problems which often result in incorrect counting. One of the most successful electro-optical counters is that disclosed in the U.S. Pat. No. 4,217,491 issued to M. H. Dufford, Jr. et al on Aug. 12, 1980. In such system, a continuously modulated beam of light is directed toward the path of the items being counted and the optical energy being reflected from the items is sensed by two separate light sensors arranged at an angle to each other and to the modulated beam. The reflected energy detected by the sensors is integrated over a relatively large number of oscillations and the resulting gains are compared and when a sufficient differentiation in signal strength is reached, a counter is actuated. However, as the surface of each item is scanned, cross-modulation tends to occur due to changes in reflectivity of the item surface, i.e. changes in color print density, surface texture, thickness of the item, etc. This tends to cause erroneous actuation of the counter.

SUMMARY OF THE INVENTION

Accordingly, a principal object of the present invention is to provide an electro-optical item sensing apparatus for sensing items moving therepast which overcomes the problems encountered by previous apparatus of this type.

Another object is to provide an electro-optical item sensing apparatus which does not physically contact the items being sensed and is immune to variations in the surface reflectivity or shape of such items.

Another object of the invention is to provide an electro-optical item sensing apparatus for sensing items moving therepast which is simple, reliable, and economical to manufacture.

According to the invention, a continuously and rapidly pulsed beam of light is projected by a light emitting device onto the path of items to be counted or otherwise detected. A first photo sensor detects the amount of optical energy reflected from each light pulse by an item passing thereunder and controls the amount of light energy transmitted by the light emitting device in response to each light pulse and in a manner such that the amount of light energy reflected from the item does not vary as a function of the reflectivity thereof. A second photo sensor also scans the items moving past the pulsed beam of light. The latter is connected to a counter or other data processing equipment but is ineffective to produce an output signal in response to the optical energy reflected from the light emitting device by the surfaces of the items. Thus, the second sensor senses only the passage of the edges of the items and is not affected by printed matter or any changes in surface reflectivity. Since the light emitting device is pulsed at a relatively rapid rate relative to the passage of items past the sensors, a highly accurate compensation for differences in reflectivity results.

BRIEF DESCRIPTION OF THE DRAWINGS

The manner in which the above and other objects of the invention are accomplished will be readily understood on reference to the following specifications when read in conjunction with the accompanying drawings, wherein:

FIG. 2 illustrates schematically the application of the invention in counting a series of spaced printed papers or the like.

DESCRIPTION OF THE PREFERRED EMBODIMENT

Figure 1:
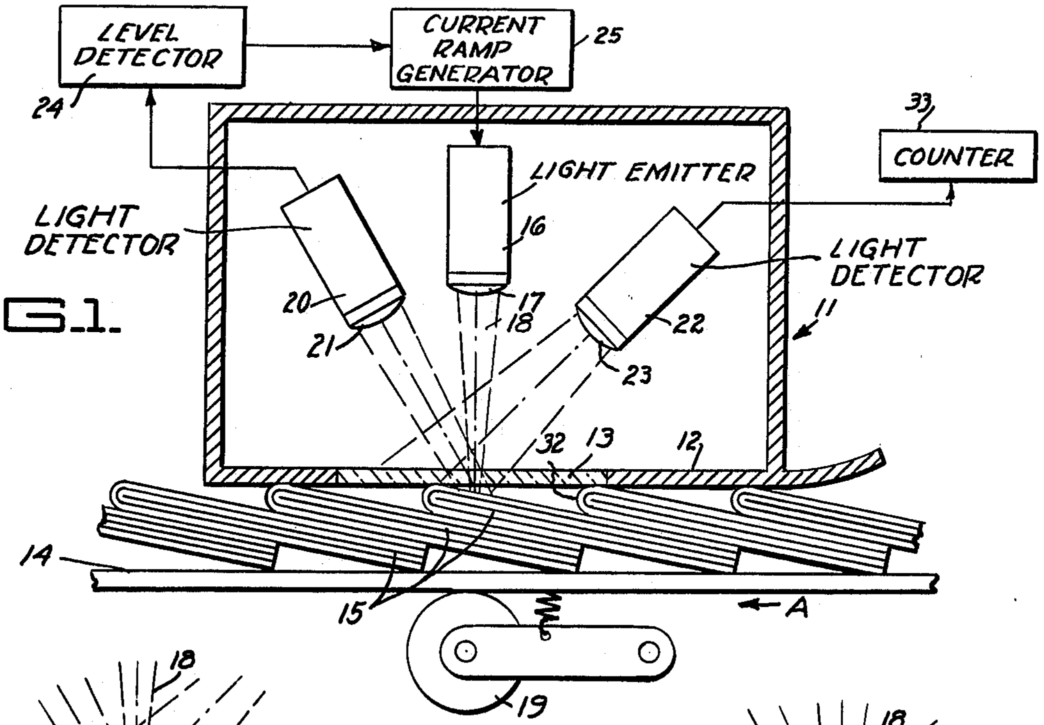
FIG. 1 is a schematic view illustrating an electro-optical item counting apparatus embodying a preferred form of the present invention and illustrating the same in counting relation with a stream of shingled or overlapped printed newspapers.

While this invention is susceptible to embodiment in many different forms, there is shown in the drawings, and will be described in detail, certain specific embodiments, with the understanding that the present disclosure is to be considered as an exemplification of the principles of the present invention and is not intended to limit the invention to the particular embodiments illustrated.

Referring to FIG. 1 in particular, the apparatus comprises a housing 11 having a bottom wall 12 in which is inset a transparent window 13.

A conveyor belt 14 is located below the housing to carry a series of overlapped printed articles, such as newspapers 15, in the direction of the arrow A past the window 13. The conveyor belt is urged upwardly by a spring actuated roller 19 to maintain the articles in wiping engagement with the bottom housing wall 12.

A light emitting device 16, preferably including a light emitting diode for emitting near infra red light, is mounted in the housing and is focused by a lens 17 to project a narrow vertical beam 18 of light onto the surfaces of the articles 15 as they pass under the window 13.

A first light detector 20, preferably including a photo diode, is mounted in the housing 11 downstream of the light emitter 16. The detector 20 is located with it's optical axis extending at an angle to the axis of the emitter 16 and intersecting the same in the general plane of the upper surfaces of the articles 15. The detector 20 is focused by a lens 21 (or light restricting aperture, not shown) to form a field of view which is somewhat larger than the diameter of the spot of light formed on the articles 15 by the beam 18.

A second light detector 22, similar to detector 20, is also mounted in the housing and is located upstream of the light emitter 16. The detector 22 is located at an angle to the emitter 16 and is also focused by a lens 23 (or light restricting aperture, not shown) to form a field of view which encompasses the spot of light formed by beam 18 and preferably is considerably larger than the field of view of the detector 20. The detector 22 is effective to actuate a counter 33 or other data processing equipment upon detecting a change in light energy of a predetermined level.

The output of the detector 20 is connected to a level detector circuit 24 which controls a current ramp generator circuit 25 which, in turn, controls the intensity or amount of light energy emitted by the light emitter 16.

Figure 4:
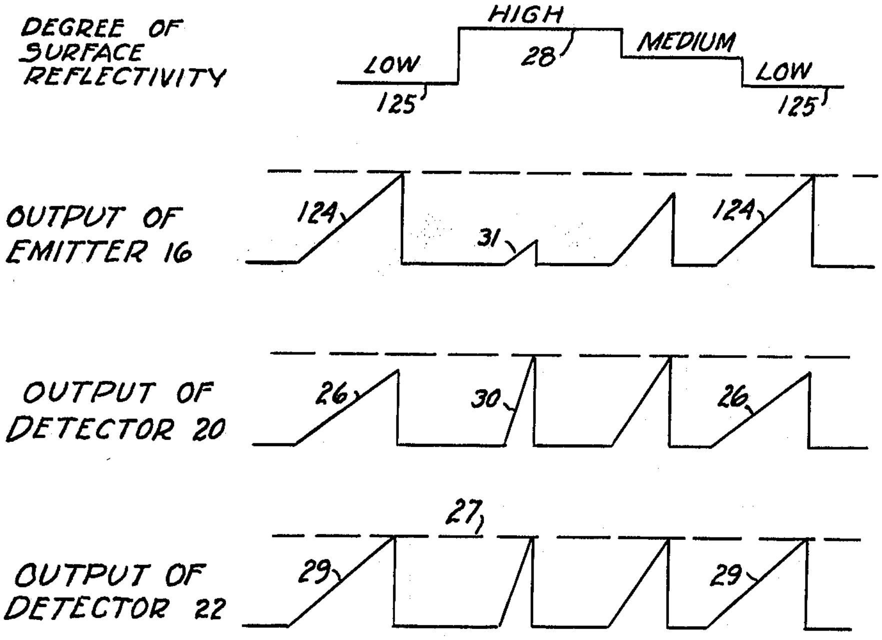
FIG. 4 is a graphical illustration showing the energization of different elements of the apparatus under different conditions.

As a printed article 15 passes under the beam 18, the ramp generator circuit 25 periodically energizes the light emitter 16 at a relatively high rate, for example, 5 KHz. During each oscillation, the generator circuit 25 applies current to the light emitter 16 at a continually increasing rate as indicated at 124 (FIG. 4). When the degree of surface reflectivity due to print density, color, surface texture, depth of the scanned portion of the surface of the article passing under the beam 18, etc., is relatively low as indicated at 125, the output of the detector 20 will likewise be low, as indicated at 26, to thus cause the level detector circuit 24 to control the generator circuit 25 to increase the ramp current so that the output of the detector 22 as indicated at 29 will rise to a predetermined level 27.

When the surface reflectivity encountered by the beam 18 is relatively high as indicated at 28, the outut of the detector 20 will increase as indicated at 30, thus causing the level detector circuit 24 and generator circuit 25 to reduce the light energy output of the emitter 16 as indicated at 31, thus causing the output of the detector 22 to remain at substantially the same level 27 as it did in response to detection of an area of low level of reflectivity.

Accordingly, the output level of the detector 22 will remain at substantially the same level for all degrees of surface reflectivity and such level will be below that effective to actuate the counter 33. However, when the leading edge 32 of an article 15 approaches the beam 18, it provides a shadowing effect relative to the field of view of the detector 22 to prevent any light from the beam 18 from being reflected to the detector 22. Accordingly, the abrupt drop in the output of the detector 22 followed by an abrupt rise as the succeeding article is scanned by the beam 18 of the light emitter 16 will become effective to energize the counter 33 or other data processing equipment.

Figure 2:
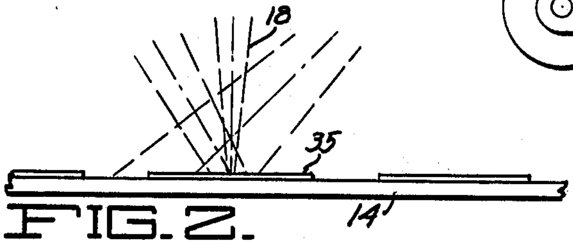

FIG. 2 illustrates the application of the apparatus of the present invention to counting or detecting spaced articles 35 which may be either single sheets of printed pages or multi-page magazines, books, or the like. Here, the articles 35 are carried past the beam 18 and the optical energy transmitted by the beam is controlled as noted above so that the amount of energy reflected to the light detector 22 does not vary as a function of the reflectivity of the upper surfaces of the articles and the detector circuit characteristics are such that it will not respond to the resulting energy changes. Thus, the detector is energized only as the edges of the articles 35 pass the beam 18 to effect large changes in energy reflection.

Figure 3:
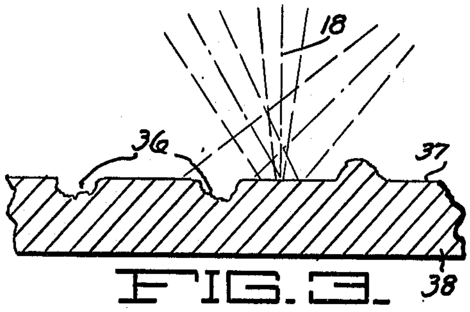
FIG. 3 illustrates schematically a cross section of an article in greatly magnified form in which surface irregularities or surface texture may be sensed by the apparatus.

A feature of the invention is that the apparatus may be utilized for counting or detecting articles or items of widely varying sizes. For example, FIG. 3 illustrates the application of the invention in counting or detecting minute imperfections 36 in the surface 37 of an article 38 passing under the beam 18. For this purpose, the beam is focused to form a spot of light on the surface 37 which is roughly one-half the area of the imperfections to be counted or sensed and the size of the fields of view of the detectors 20 and 22 are reduced accordingly. Thus, the apparatus may be utilized to sense the smoothness or the surface texture of an article and to control a counter or other data processing equipment accordingly.

Figure 5:
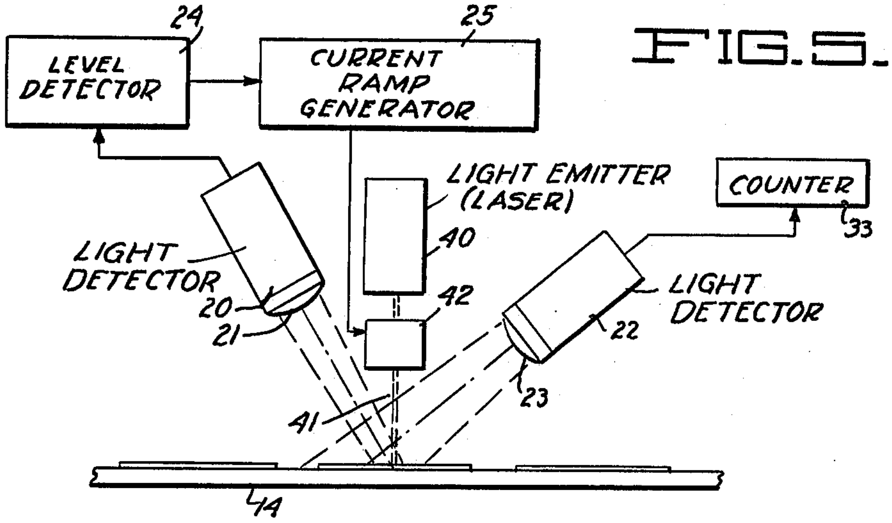
FIG. 5 is a schematic view similar to FIG. 1 but incorporating a laser type light emitter.

FIG. 5 illustrates a modified form of the invention in which a laser 40 is employed in lieu of the light emitting diode embodied in the light emitter 16 of FIG. 1. In this case, the coherent laser beam 41 is modulated by a light modulator 42 which is controlled by the ramp generator circuit 25 to effect the same results as obtained by the apparatus of FIG. 1.

Figure 6:
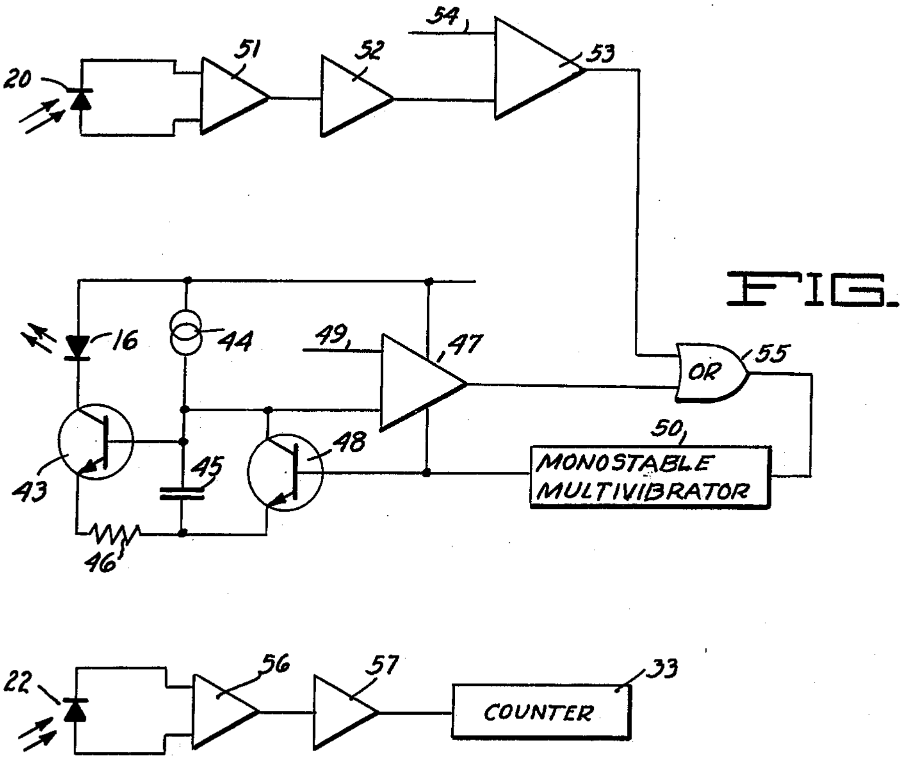
FIG. 6 is a circuit diagram of the apparatus.

Describing now the circuitry for controlling the light emitter 16 and light detectors 20 and 22 of FIG. 1, reference is had to FIG. 6. The light emitting diode 16 which is preferably of the type manufactured by General Electric Company under the trade number GE-F5E1, is connected in circuit with the collector, emitter of an NPN transistor 43, a constant current source 44, a capacitor 45, and a resistor 46. The base of transistor 43 is connected to the juncture of the source 44 and capacitor 45 and to one input of a comparitor unit 47. The capacitor 45 is also connected across the collector, emitter of a second transistor 48 whose base is controlled by a monostable multivibrator 50.

The photo detector 20, which is preferably of the type manufactured by Silicon Detector Company under the trade number SD-100-11-21-021, is connected through amplifiers 51 and 52 to one input of a comparitor unit 53, the other input 54 of which is connected to a suitable source of reference power. The output of comparitor 53 is connected to one input of an OR gate 55 whose output is connected to the input of the monostable multivibrator 50. The other input 49 of comparitor 47 is connected to a maximum power reference source.

The transistor 43 is either fully conducting or off and when turned on enables the capacitor 45 to discharge through the diode 16 with constantly increasing power. The reflected optical energy from the diode 16 is detected by detector 20 and when the output from amplifier 52 reaches the level of the input 54, the comparitor 53 transmits an output signal through gate 55 to trigger the monostable multivibrator 50, turning transistor 48 on momentarily which discharges capacitor 45. Thereafter, the constant current device 44 recharges the capacitor 45 to turn transistor 43 on again. As the capacitor 45 changes the increasing voltage level is compared with the maximum voltage level at input 49 and when such are equal an output signal is emitted by comparitor 47 to again effect discharging of the capacitor to thus maintain a pulse repetition rate which is determined by the RC constant of capacitor 45 and resistor 46.

The photo detector 22 is preferably of the same type as detector 20 and is connected through suitable amplifiers 56 and 57 to the counter 33.

I claim:

1. A system for detecting items moving in a path past a sensing station, said items having surfaces of varying radiant energy reflecting characteristics, comprising;

a radiant energy emitting device for projecting a beam of radiant energy towards said path and onto each of said items that said items pass said station, a first radiant energy sensing device directed towards said sensing station and effective to receive radiant energy reflected from said beam by said items, said first sensing device being effective to produce an output signal having an amplitude proportional to the amount of radiant energy reflecteed thereto by said items, a second radiant energy sensing device directed towards said sensing station and effective to receive radiant energy reflected from said beam by the surfaces of said items and to produce an output signal upon passage of an edge of each of said items past said station, a signal utilization device controlled solely by said second sensing device upon producing a said output signal above a predetermined level, means for periodically energizing said emitting device through successive periods of energization, said energizing means comprising means for energizing said emitting device at a constantly varying level of energization during each said period, and control means responsive to said first sensing device for controlling said last mentioned means during each of said periods to vary the amount of said radiant energy emitted device in a manner to maintain the radiant energy reflected to said second sensing device substantially independent of the reflectivity characteristics of said items, the amount of said energy reflected from said surfaces to said second sensing device being insufficient to cause said second sensing device to control said signal utilization device.

2. A system for detecting items moving in a path past a sensing station, said items having surfaces of varying radiant energy reflecting characteristics, comprising;

a radiant energy emitting device for projecting a beam of radiant energy towards said path and onto each of said items as said items pass said station, a first radiant energy sensing device directed towards said sensing station and effective to receive radiant energy reflected from said beam by said items, said first sensing device being effective to produce an output signal having an amplitude proportional to the amount of radiant energy reflected thereto by said items, a second radiant energy sensing device directed towards said sensing station and effective to receive radiant energy reflected from said beam by the surfaces of said items and to produce an output signal upon passage of an edge of each of said items past said station, a signal utilization device controlled solely by said second sensing device upon producing a said output signal above a predetermined level, means for periodically energizing said emitting device through successive periods of energization, said energizing means comprising means for energizing said emitting device at a constantly increasing level of energization during each said period, control means responsive to said first sensing device for controlling said last mentioned means to vary the amount of said radiant energy emitted by said emitting device in a manner to maintain the radiant energy reflected to said second sensing device substantially independent of the reflectivity characteristics of said items, the amount of said energy reflected from said surfaces to said second sensing device being insufficient to cause said second sensing device to control said signal utilization device.

3. A system as defined in claim 1 wherein said emitting device comprises means for focusing a spot of near infra-red light at said sensing station.

4. A system as defined in claim 1 wherein said radiant energy emitting device comprises a laser.

5. A system as defined in claim 1 wherein said emitting device projects said beam at substantially 90 degrees to the plane of said path, and said second sensing device is directed at a predetermined angle to said beam and toward said sensing station.

6. A system as defined in claim 1 wherein said emitting device projects said beam at substantially 90 degrees to the plane of said path, and said first sensing device is directed at a predetermined angle to said beam toward said sensing station and wherein the field of view of said second sensing device extends over an area greater than the area illuminated by said beam.

7. A system as defined in claim 6 wherein said second sensing device is located upstream of said sensing station.

8. A system as defined in claim 1 wherein the field of view of each of said sensing devices extends over an area greater than the area illuminated by said beam.

9. A system for counting overlapped printed articles moved in a path past a sensing station, and wherein the leading edge of each of said articles extends forwardly of the leading edge of a next adjacent article, each of said articles defining areas of varying reflective surface conditions which change the amount of radiant energy reflected from the surfaces of said articles, comprising;

a radiant energy emitting device for projecting a beam of radiant energy towards said sensing station and onto each of said items as said items pass said station, a first radiant energy sensing device directed towards said sensing station and effective to receive radiant energy reflected from said beam from said articles as said articles pass said sensing station, said sensing device being effective to produce an output signal having an amplitude proportional to the amount of radiant energy reflected thereto by said articles, a second radiant energy sensing device directed towards said sensing station and effective to receive radiant energy reflected by said beam by said articles as said articles pass said sensing station, counting means controlled solely by said second sensing device upon sensing radiant energy above a first predetermined level only, means for periodically energizing said emitting device through periods of energization, and control means responsive to said first sensing device for controlling said last mentioned means to vary the amplitude of said radiant energy emitted by said emitting device during each of said periods in inverse proportion to the amount of said radiant energy received by said first sensing device from said surfaces of said articles whereby to maintain the level of said radiant energy below said first level when said surfaces of said articles pass said sensing station and whereby said counting means will count only upon passage of each of said edges past said sensing station.

* * * * *